(12) United States Patent
Yamamoto et al.

(10) Patent No.: US 7,481,525 B2
(45) Date of Patent: Jan. 27, 2009

(54) INK-JET WATER-BASED INK, INK-JET RECORDING METHOD, INK CARTRIDGE AND INK-JET RECORDING APPARATUS

(75) Inventors: Tomoya Yamamoto, Awara (JP); Suzuka Ueno, Awara (JP); Yukiko Tachibana, Himeji (JP)

(73) Assignee: Canon Finetech Inc., Ibaraki (JP)

( * ) Notice: Subject to any disclaimer, the term of this patent is extended or adjusted under 35 U.S.C. 154(b) by 345 days.

(21) Appl. No.: 11/359,442

(22) Filed: Feb. 23, 2006

(65) Prior Publication Data

US 2006/0192826 A1 Aug. 31, 2006

(30) Foreign Application Priority Data

Feb. 28, 2005 (JP) ............................. 2005-053246

(51) Int. Cl.
*G01D 11/00* (2006.01)
(52) U.S. Cl. ..................... 347/100; 347/95; 523/160
(58) Field of Classification Search ............... 347/100, 347/95, 96, 101; 106/31.6, 31.27, 31.13; 523/160

See application file for complete search history.

(56) References Cited

U.S. PATENT DOCUMENTS

| | | | |
|---|---|---|---|
| 5,017,227 A | 5/1991 | Koike et al. ............... | 106/22 |
| 5,059,246 A | 10/1991 | Yamamoto et al. ........ | 106/22 |
| 5,082,496 A | 1/1992 | Yamamoto et al. ........ | 106/22 |
| 5,110,356 A | 5/1992 | Shirota et al. ............. | 106/22 |
| 5,123,960 A | 6/1992 | Shirota et al. ............. | 106/22 |
| 5,127,946 A | 7/1992 | Eida et al. ................. | 106/22 |
| 5,130,723 A | 7/1992 | Yamamoto et al. ........ | 346/1.1 |
| 5,135,570 A | 8/1992 | Eida et al. ................. | 106/22 |
| 5,139,573 A | 8/1992 | Yamamoto et al. ........ | 106/22 |
| 5,167,703 A | 12/1992 | Eida et al. ................. | 106/22 K |
| 5,178,671 A | 1/1993 | Yamamoto et al. ........ | 106/22 K |
| 5,213,614 A | 5/1993 | Eida et al. ................. | 106/22 K |
| 5,215,577 A | 6/1993 | Eida et al. ................. | 106/22 K |
| 5,215,578 A | 6/1993 | Eida et al. ................. | 106/22 K |
| 5,216,437 A | 6/1993 | Yamamoto et al. ........ | 346/1.1 |
| 5,231,417 A | 7/1993 | Shirota et al. ............. | 346/1.1 |
| 5,250,121 A | 10/1993 | Yamamoto et al. ........ | 106/22 R |
| 5,258,505 A | 11/1993 | Eida et al. ................. | 534/680 |
| 5,358,558 A | 10/1994 | Yamamoto et al. ........ | 106/22 R |
| 5,396,275 A | 3/1995 | Koike et al. ............... | 347/101 |
| 5,429,671 A | 7/1995 | Yamamoto ................ | 106/22 K |
| 5,451,251 A | 9/1995 | Mafune et al. ............ | 106/22 H |

(Continued)

FOREIGN PATENT DOCUMENTS

JP        10-53741 A    2/1998

(Continued)

*Primary Examiner*—Manish S Shah
(74) *Attorney, Agent, or Firm*—Fitzpatrick, Cella, Harper & Scinto (57) ABSTRACT

The invention provides an ink-jet water-based ink that can stably record images having high fastness properties and excellent quality over a long period of time even in any case, and further provides an ink-jet recording method, by which images having excellent fastness properties and quality can be recorded, and an ink cartridge and an ink-jet recording apparatus containing such an ink. The ink-jet water-based ink principally includes a water-insoluble coloring material, a water-soluble organic solvent, an auxiliary component and water, wherein at least polyoxyethylene castor oil or polyoxyethylene hardened castor oil is contained as the auxiliary component.

10 Claims, 4 Drawing Sheets

U.S. PATENT DOCUMENTS

| | | | |
|---|---|---|---|
| 5,462,787 A | 10/1995 | Yamamoto et al. | 428/195 |
| 5,466,282 A | 11/1995 | Eida et al. | 106/22 K |
| 5,468,553 A | 11/1995 | Koike et al. | 428/224 |
| 5,494,733 A | 2/1996 | Koike et al. | 428/224 |
| 5,500,023 A | 3/1996 | Koike et al. | 8/499 |
| 5,515,093 A | 5/1996 | Haruta et al. | 347/101 |
| 5,540,764 A | 7/1996 | Haruta et al. | 106/20 R |
| 5,565,238 A | 10/1996 | Yamamoto et al. | 427/146 |
| 5,594,485 A | 1/1997 | Koike et al. | 347/101 |
| 5,645,631 A | 7/1997 | Koike et al. | 106/31.36 |
| 5,658,376 A | 8/1997 | Noguchi et al. | 106/31.43 |
| 5,686,951 A | 11/1997 | Koike et al. | 347/106 |
| 5,698,478 A | 12/1997 | Yamamoto et al. | 442/153 |
| 5,764,261 A | 6/1998 | Koike et al. | 347/100 |
| 5,781,216 A | 7/1998 | Haruta et al. | 347/106 |
| 5,782,967 A | 7/1998 | Shirota et al. | 106/31.58 |
| 5,849,815 A * | 12/1998 | Aoki et al. | 523/160 |
| 5,902,387 A | 5/1999 | Suzuki et al. | 106/22 R |
| 5,922,625 A | 7/1999 | Haruta et al. | 442/75 |
| 5,954,866 A * | 9/1999 | Ohta et al. | 106/31.89 |
| 6,033,066 A | 3/2000 | Koike et al. | 347/101 |
| 6,036,307 A | 3/2000 | Hakamada et al. | 347/106 |
| 6,139,939 A | 10/2000 | Haruta et al. | 428/195 |
| 6,214,963 B1 | 4/2001 | Noguchi et al. | 528/71 |
| 6,394,597 B1 | 5/2002 | Koike et al. | 347/106 |
| 6,426,766 B1 | 7/2002 | Shirota et al. | 347/106 |
| 6,552,156 B2 | 4/2003 | Noguchi et al. | 528/71 |
| 6,578,958 B2 * | 6/2003 | Gotoh et al. | 347/100 |
| 6,833,158 B2 | 12/2004 | Suzuki et al. | 427/149 |
| 6,843,839 B2 | 1/2005 | Kanke et al. | 106/31.47 |
| 7,008,671 B2 | 3/2006 | Ishikawa et al. | 427/152 |
| 2003/0199613 A1 * | 10/2003 | Ninomiya et al. | 523/160 |
| 2004/0116553 A1 * | 6/2004 | Nakamura et al. | 523/160 |
| 2005/0005818 A1 | 1/2005 | Sato et al. | 106/31.27 |
| 2005/0191446 A1 | 9/2005 | Ishikawa et al. | 428/32.34 |
| 2005/0197424 A1 | 9/2005 | Higashi et al. | 523/160 |
| 2007/0032570 A1 | 2/2007 | Sato et al. | 523/160 |
| 2007/0105980 A1 | 5/2007 | Yamamoto et al. | 523/160 |

FOREIGN PATENT DOCUMENTS

| | | |
|---|---|---|
| JP | 11-322866 A | 11/1999 |
| JP | 11-322942 A | 11/1999 |
| JP | 2000-17211 A | 1/2000 |
| JP | 2003-192976 A | 7/2003 |

* cited by examiner

INK-JET WATER-BASED INK, INK-JET RECORDING METHOD, INK CARTRIDGE AND INK-JET RECORDING APPARATUS

BACKGROUND OF THE INVENTION

1. Field of the Invention

The present invention relates to an ink-jet water-based ink, an ink-jet recording method, an ink partridge and an ink-jet recording apparatus, and particularly to a coloring-material-dispersed water-based ink high in ejection stability and good in coloring of images formed from this ink and suitable for use in ink-jet recording, and an ink-jet recording method, an ink cartridge and an ink-jet recording apparatus using this ink.

2. Related Background Art

Water-based inks using a water-soluble coloring material have heretofore been often used as ink-jet inks. In recent years, attention has been paid to water-insoluble coloring materials excellent in fastness properties such as water fastness and weatherability, such as pigments, and various attempts have been made. Since the water-insoluble coloring materials are not dissolved in water, a method using an ink containing such a coloring material as a non-aqueous ink is employed. Japanese Patent Application Laid-Open No. 2000-17211 has proposed a non-aqueous ink to which polyoxyethylene castor oil is added. However, there are many limitations to use the non-aqueous ink as an ink-jet ink, and care is required even from the viewpoint of safety. There is thus a demand for development of a water-based ink using a water-insoluble coloring material. In order to use the water-insoluble coloring material as a coloring material for water-based inks, it is required to stably disperse the water-insoluble coloring material in an aqueous medium, and a coloring-material-dispersed water-based ink obtained by adding a dispersant such as a polymeric compound or surfactant to uniformly disperse the water-insoluble coloring material in the aqueous medium is required.

When such a coloring-material-dispersed water-based ink is used in ink-jet recording, it is attempted to cause the water-insoluble coloring material in the ink to have an aggregating function and a water-insolubilizing function for the purpose of improving the fixability and water fastness of the ink on paper. However, the dispersion stability of the water-insoluble coloring material in the ink comes to be lowered by allowing the water-insoluble coloring material to have such functions, which involves such problems that the water-insoluble coloring material tends to aggregate during storage of the ink to cause density unevenness and precipitation, and clogging at orifices of an ink-jet recording apparatus by drying of the ink is easily caused to lower the ejection stability of the ink. Since the water-insoluble coloring material is easy to aggregate on the surface of a recording material, a printed image also has a problem that saturation is greatly lowered due to light scattering caused by aggregated particles to deteriorate the color developing property of the ink.

In order to solve the above-described problems, there has been proposed an ink containing a polyoxyalkylene (see Japanese Patent Application Laid-Open No. H10-53741). However, the proposed ink yet has no effect to improve ejection stability of the ink, and in the case where the composition of the ink is greatly changed, such as the case where the ink is concentrated at orifices, which is always caused when the ink is used in an ink-jet recording apparatus, the dispersion stability of the water-insoluble coloring material in the ink is liable to be lowered. Therefore, the water-insoluble coloring material greatly adheres to peripheral portions of nozzles of the ink-jet recording apparatus, so that ejection failure and dot misalignment are easy to occur. Thus, this ink does not yet reach a level satisfying the ejection stability. In particular, in the case of an ink-jet recording apparatus having a line head, the cleaning and recovering operation of ink-jet nozzles of which cannot be frequently conducted, the occurrence of the ink ejection failure and dot misalignment becomes a big problem.

SUMMARY OF THE INVENTION

The present invention has been made with the above-described problems in view and has as its object the provision of an ink-jet water-based ink (hereinafter referred to as "ink" merely) that can stably record images having high fastness properties and excellent quality over a long period of time in all cases.

Another object of the present invention is to provide an ink-jet recording method, by which images having excellent fastness properties and quality can be recorded, and an ink cartridge and an ink-jet recording apparatus containing such an ink.

The present inventors have carried out an extensive investigation with a view toward solving the above-described objects. As a result, it has been found that the problems can be solved by the invention described below.

According to the present invention, there is thus provided an ink principally comprising a water-insoluble coloring material, a water-soluble organic solvent, an auxiliary component and water, wherein at least polyoxyethylene castor oil or polyoxyethylene hardened castor oil is contained as the auxiliary component.

In the present invention, it may be preferable that the water-insoluble coloring material is a pigment, and the pigment is dispersed by a polymer dispersant. In particular, it may be more preferable that the polymer dispersant is a polymeric compound formed of at least a monomer having an anionic hydrophilic group, a monomer having an oxyethylene group and a monomer having a hydrophobic group, and that the ratio (A)/(B) of the number (A) of oxyethylene units in the polyoxyethylene castor oil or polyoxyethylene hardened castor oil to the number (B) of oxyethylene units in the polymer dispersant falls within a range of from 0.1 to 5.

In the present invention, it may be preferable that polyethylene glycol or polypropylene glycol is contained as another auxiliary component.

In the present invention, it may be preferable that the polymer dispersant is a block copolymer comprising a hydrophobic block composed of at least one vinyl ether and a hydrophilic block composed of at least one vinyl ether. In the present invention, it may be more preferable that the hydrophilic block of the polymer dispersant comprises a block composed of a vinyl ether having a nonionic hydrophilic group and a block composed of a vinyl ether having an anionic hydrophilic group, and that the polymer dispersant comprises a block composed of a hydrophobic vinyl ether, a block composed of a hydrophilic vinyl ether having a nonionic hydrophilic group and a block composed of a hydrophilic vinyl ether having an anionic hydrophilic group in this order.

According to the present invention, there is also provided an ink-jet recording method comprising applying energy to an ink to eject the ink, thereby applying the ink to a recording material to conduct recording, wherein the ink is any one of the above-described inks. In this case, it may be preferable that the energy is thermal energy and that the recording material is a recording material having an ink-receptive coating layer on at least one surface thereof.

According to the present invention, there is further provided an ink cartridge comprising an ink-storing portion storing an ink, wherein the ink is any one of the above-described inks.

According to the present invention, there is still further provided an ink-jet recording apparatus comprising an ink cartridge equipped with an ink-storing portion storing an ink and a head portion for ejecting the ink, wherein the ink is any one of the above-described inks.

According to the present invention, there can be provided inks that have high fastness properties and can stably record images excellent in quality over a long period of time in all cases, and further provided an ink-jet recording method, and an ink cartridge and an ink-jet recording apparatus, by which images having excellent fastness properties and quality can be recorded.

DETAILED DESCRIPTION OF THE PREFERRED EMBODIMENTS

The present invention will hereinafter be described in detail.

The present inventors have found that when an ink principally comprising a water-insoluble coloring material, a water-soluble organic solvent, an auxiliary component and water contains at least polyoxyethylene castor oil or polyoxyethylene hardened castor oil as the auxiliary component, such ink makes it possible to stably record images having high fastness properties and excellent quality in all cases.

The polyoxyethylene castor oil or polyoxyethylene hardened castor oil has a good affinity for the water-insoluble coloring material in the ink. Since the polyoxyethylene castor oil or polyoxyethylene hardened castor oil has a branched structure, the polyoxyethylene castor oil or polyoxyethylene hardened castor oil develops a steric affinity for the water-insoluble coloring material. Therefore, the polyoxyethylene castor oil or polyoxyethylene hardened castor oil stably exists between particles of the water-insoluble coloring material on the surface of a recording material to serve to anchor the coloring material to the surface of the recording material, whereby the abrasion resistance of a printed image is improved. In addition, since the ink using the polyoxyethylene castor oil or polyoxyethylene hardened castor oil prevents aggregation among particles of the water-insoluble coloring material, the saturation of the printed image is also hard to be lowered, and so the ink comes to develop a good color developing property. Further, since the oxyethylene moiety of the polyoxyethylene castor oil or polyoxyethylene hardened castor oil has a strong affinity for the aqueous medium, the dispersion stability of the water-insoluble coloring material in the aqueous medium is improved to improve the dispersion stability and ejection stability of the ink.

In other words, it is considered that the polyoxyethylene castor oil or polyoxyethylene hardened castor oil moderately prevents the aggregation among the water-insoluble coloring material particles, thereby developing an effect to prevent the lowering of the color developing property on the surface of the recording material. Further, it is considered that the polyoxyethylene castor oil or polyoxyethylene hardened castor oil has an oxyethylene group having a good affinity for the ink medium, so that the dispersion stability of the water-insoluble coloring material in the ink can be improved.

When the water-insoluble coloring material is a pigment, a polymer dispersant having an oxyethylene group is used as the dispersant, and the content of oxyethylene in the polymer dispersant and the content of oxyethylene in the polyoxyethylene castor oil or polyoxyethylene hardened castor oil are controlled within respective specific ranges, whereby the affinity of the water-insoluble coloring material dispersed by the polymer dispersant for the polyoxyethylene castor oil or polyoxyethylene hardened castor oil can be improved to still further improve the color developing property of the ink.

These effects of the polyoxyethylene castor oil or polyoxyethylene hardened castor oil prevent the deterioration of the color developing property by aggregation of the water-insoluble coloring material on the surface of the recording material, which is a demerit of the coloring-material-dispersed water-based ink, improve the stability for long-term storage of the ink and moreover permit the ink to be stably ejected without lowering the dispersion stability of the water-insoluble coloring material even when the composition of the ink is greatly changed, such as the case where the ink is concentrated at orifices, which is always caused when the ink is used in an ink-jet recording apparatus. Further, since polyoxyethylene castor oil or polyoxyethylene hardened castor oil can prevent the water-insoluble coloring material from adhering to peripheral portions of nozzles, ejection failure and dot misalignment are hard to occur even in the case of an ink-jet recording apparatus having a line head, the cleaning and recovering operation of ink-jet nozzles of which cannot be frequently conducted, so that good continuous printing performance can be achieved over a long period of time.

The components of the inks according to the present invention will hereinafter be described in more detail.

[Polyoxyethylene Castor Oil and Polyoxyethylene Hardened Castor Oil]

The polyoxyethylene castor oil and polyoxyethylene hardened castor oil used in the inks according to the present invention are compounds obtained by condensing ethylene oxide with castor oil and hardened castor oil obtained by hydrogenating castor oil, respectively. Among others, a compound having a structure represented by the following formula 1 and a compound having a structure represented by the following formula 2 are desirable as the polyoxyethylene castor oil and polyoxyethylene hardened castor oil, respectively.

Formulae (1)

-continued

Formulae (2)

In the formulae, l+m+n+x+y+z is from 10 to 100, preferably from 20 to 60. Incidentally, the values within these ranges in the present invention indicate average values because the number of polyoxyethylene groups in the polyoxyethylene castor oil or polyoxyethylene hardened castor oil is not uniform. If the value of l+m+n+x+y+z is smaller than 10, the affinity of the polyoxyethylene castor oil and polyoxyethylene hardened castor oil for an ink medium is lowered, and so the stability of the water-insoluble coloring material in the ink may be liable to be lowered in some cases. If the value of l+m+n+x+y+z exceeds 100, the affinity of the polyoxyethylene castor oil and polyoxyethylene hardened castor oil for the water-insoluble coloring material is lowered, and so the coloring of a printed image may be liable to be lowered in some cases.

As such polyoxyethylene castor oil and polyoxyethylene hardened castor oil, there may preferably be used those produced by adding ethylene oxide to castor oil or hardened castor oil in the presence of a base catalyst through a gas-phase method or liquid-phase method in accordance with a process known per se in the art, in addition to commercially available products. The identification as to the numbers of ethylene oxides in the polyoxyethylene castor oil and polyoxyethylene hardened castor oil may be conducted by the qualitative analysis and quantitative analysis of functional groups by NMR and IR and analyses by various kinds of chromatography. These polyoxyethylene castor oils and polyoxyethylene hardened castor oils may be used either singly or in any combination thereof. The content of the polyoxyethylene castor oil or polyoxyethylene hardened castor oil in the ink is within a range of preferably from 0.1 to 5% by mass, more preferably from 0.2 to 2% by mass.

[Water-insoluble Coloring Material]

Any coloring material may be used as the water-insoluble coloring material used in the inks according to the present invention so far as it is scarcely dissolved in water. More specifically, it is a coloring material having a solubility in water of preferably not higher than 0.5% by mass, more preferably not higher than 0.1% by mass. Such coloring materials include oil-soluble dyes, vat dyes, disperse dyes and pigments, with pigments being preferred.

Examples of water-insoluble coloring materials are mentioned below. However, the coloring materials are not limited thereto.

(Oil-soluble Dye)

C.I. Solvent Yellow 1, 2, 3, 13, 14, 19, 21, 22, 29, 36, 37, 38, 39, 40, 42, 43, 44, 45, 47, 62, 63, 71, 76, 79, 81, 82, 83:1, 85, 86, 88 and 151; C.I. Solvent Red 8, 27, 35, 36, 37, 38, 39, 40, 49, 58, 60, 65, 69, 81, 83:1, 86, 89, 91, 92, 97, 99, 100, 109, 118, 119, 122, 127 and 218; C.I. Solvent Blue 14, 24, 25, 26, 34, 37, 38, 39, 42, 43, 44, 45, 48, 52, 53, 55, 59, 67 and 70; and C.I. Solvent Black 3, 5, 7, 8, 1.4, 17, 19, 20, 22, 24, 26, 27, 28, 29, 43 and 45.

(Vat Dye)

C.I. Vat Yellow 2, 4, 10, 20 and 33; C.I. Vat Orange 1, 2, 3, 5, 7, 9, 13, 15; C.I. Vat Red 1, 2, 10, 13, 15, 16 and 61; C.I. Vat Blue 1, 3, 4, 5, 6, 8, 12, 14, 1.8, 19, 20, 29, 35 and 41; and C.I. Vat Black 1, 8, 9, 13, 14, 20, 25, 27, 29, 36, 56, 57, 59 and 60.

(Disperse Dye)

C.I. Disperse Yellow 5, 42, 83, 93, 99, 198 and 224; C.I. Disperse Orange 29, 49 and 73; C.I. Disperse Red 92, 126, 145, 152, 159, 177, 181, 206 and 283; and C.I. Disperse Blue 60, 87, 128, 154, 201, 214, 224, 257, 287 and 368.

(Pigment)

Raven 760 Ultra, Raven 1060 Ultra, Raven 1080, Raven 1100 Ultra, Raven 1170, Raven 1200, Raven 1250, Raven 1255, Raven 1500, Raven 2000, Raven 2500 Ultra, Raven 3500, Raven 5250, Raven 5750, Raven 7000, Raven 5000 ULTRAII and Raven 1190 ULTRAII (all, products of Columbian Carbon Japan Limited); Black Pearls L, MOGUL-L, Regal 400R, Regal 660R, Regal 330R, Monarch 800, Monarch 880, Monarch 900, Monarch 1000, Monarch 1300 and Monarch 1400 (all, products of Cabot Company); Color Black FW1, Color Black FW2, Color Black FW200, Color Black 18, Color Black S160, Color Black S170, Special Black 4, Special Black 4A, Special Black 6, Special Black 550, Printex 35, Printex 45, Printex 55, Printex 85, Printex 95, Printex U, Printex 140U, Printex V and Printex 140V (all, products of Degussa Co.); No. 25, No. 33, No. 40, No. 45, No. 47, No. 52, No. 900, No. 970, No. 2200B, No. 2300, No. 2400B, MCF-88, MA600, MA77, MA8, MA100, MA230 and MA220 (all, products of Mitsubishi Chemical Corporation); C.I. Pigment Yellow 3, 12, 13, 14, 17, 20, 24, 74, 83, 86, 93, 95, 97, 109, 110, 117, 120, 125, 128, 137, 138, 147, 148, 150, 151, 153, 154, 166, 168, 175, 180, 183, 184 and 185; C.I. Pigment Orange 16, 36, 43, 51, 55, 59, 61 and 71; C.I. Pigment Red 9, 12, 48, 49, 52, 53, 57, 97, 122, 123, 149, 168, 175, 176, 177, 180, 184, 192, 202, 215, 216, 217, 220, 223, 224, 226, 227, 228, 238, 240, 254, 255 and 272; C.I. Pigment Violet 19, 23, 29, 30, 32, 37, 40 and 50; C.I. Pigment Blue 15, 15:1, 15:2, 15:3, 15:4, 15:6, 16, 22, 60 and 64; C.I. Pigment Green 7 and 36; C.I. Pigment Brown 23, 25 and 26; and C.I. Pigment Black 1, 10, 31 and 32.

The content of the water-insoluble coloring material in the ink according to the present invention is within a range of preferably from 0.1 to 20% by mass, more preferably from 1.0 to 10% by mass based on the whole mass of the ink. If the content of the water-insoluble coloring material is lower than 0.1% by mass, it may be difficult in some cases to achieve a sufficient optical density. If the content exceeds 20% by mass, the deterioration of the ejection stability by clogging at orifices, or the like is liable to occur. Incidentally, these water-insoluble coloring materials may be used either singly or in any combination thereof.

The water-insoluble coloring materials used in the inks according to the present invention are required to be uniformly dispersed in the inks. Since the water-insoluble coloring materials themselves used in the present invention are coloring materials scarcely dissolved in water, they are required to be dispersed in an ink medium. Methods for dispersing the water-insoluble coloring material in an ink medium include a method in which a hydrophilic group is added to the surface of the coloring material to disperse the coloring material in the ink medium by itself, and a method in which a polymer dispersant is used to disperse the coloring material. Among these, a dispersion obtained by using a pigment as the water-insoluble coloring material and dispersing the pigment with the polymeric dispersant is preferably used because the coloring of a printed image is further improved.

As the method for introducing the hydrophilic group into the surface of the coloring material, there may be used any of publicly known methods and newly invented methods. For example, publicly known methods such as an oxidizing treatment with an oxidizing agent (for example, nitric acid, a permanganate, a dichromate, a hypochlorite, ammonium persulfate, hydrogen peroxide or ozone), a treatment with a coupling agent such as a silane compound and a plasma treatment, and newly developed methods other than the known methods may be used, and these methods may also be used in combination.

As a method for dispersing the water-insoluble coloring material (pigment) using the polymer dispersant, there may be mentioned a method in which the water-insoluble coloring material and the polymer dispersant are kneaded with each other, the kneaded product is added into a predetermined liquid medium to disperse it, and water for dilution and various kinds of additives are then added to prepare a dispersion liquid. A kneader, roll mill or the like may be used in the kneading of the water-insoluble coloring material with the polymer dispersant, and application of ultrasonic waves, or a dispersing machine such as a bead mill or ball mill may be used in the dispersion.

[Polymer Dispersant]

As a polymer dispersant preferably used in the present invention, any polymer dispersant may be used so far as it is a polymeric compound having a hydrophilic unit and a hydrophobic unit in combination and functioning as a dispersant for the water-insoluble coloring materials. Among others, polymeric compounds formed from a monomer having an anionic hydrophilic group, a monomer having an oxyethylene group and a monomer having a hydrophobic group may preferably be used. When the polymer dispersant has an oxyethylene group, the number (A) of oxyethylene units in the polyoxyethylene castor oil or polyoxyethylene hardened castor oil desirably falls within a range of from 0.1 to 5, preferably from 0.2 to 2 in terms of the ratio A/B of the number (A) of oxyethylene units to the number (B) of oxyethylene units in this polymer dispersant because the affinity of the polymer dispersant for the polyoxyethylene castor oil or polyoxyethylene hardened castor oil is improved. If the number of oxyethylene units in the polyoxyethylene castor oil or polyoxyethylene hardened castor oil is less than 0.1 of the number of oxyethylene units in the polymer dispersant, the dispersion stability of the water-insoluble coloring material is liable to be lowered. If the number (as a ratio) of oxyethylene units in the oil exceeds 5, the deterioration of a printed image may be caused in some cases. It is hence not preferable for the ratio not to fall within the above range. Incidentally, the numbers of oxyethylene units in the polyoxyethylene castor oil, polyoxyethylene hardened castor oil and polymer dispersant mean the number of oxyethylene units in one molecule of each of them.

Such polymer dispersants include polymeric compounds obtained by polymerizing a vinyl monomer. Examples thereof include polymeric compounds obtained by polymerizing at least one hydrophobic monomer selected from the group consisting of acrylic esters and methacrylic esters having an alkyl group, phenyl group or the like as a hydrophobic group, such as octyl methacrylate, dodecyl acrylate and benzyl methacrylate, and various kinds of esters such as crotonic esters, itaconic esters, maleic esters and fumaric esters, a nonionic hydrophilic monomer having an oxyethylene group, such as triethylene glycol methyl ether methacrylate or polyethylene glycol ethyl ether acrylate, and a monomer having an acidic group, such as acrylic acid, methacrylic acid, crotonic acid, itaconic acid, maleic acid or fumaric acid.

Among these, the polymer dispersant is desirably a block copolymer comprising a hydrophobic block composed of at least one vinyl ether and a hydrophilic block composed of at least one vinyl ether from, the viewpoints of the coloring of a printed image and the dispersion stability of the water-insoluble coloring material, because the affinity of the polymer dispersant for the polyoxyethylene castor oil or polyoxyethylene hardened castor oil is improved. In particular, it is more preferable that the hydrophilic block of the polymer dispersant comprises a block composed of a vinyl ether having a nonionic hydrophilic group comprising at least an oxyethylene group and a block composed of a vinyl ether having an anionic hydrophilic group, and that the polymer dispersant comprises a block composed of a hydrophobic vinyl ether, a block composed of a hydrophilic vinyl ether having a nonionic hydrophilic group with an oxyethylene group and a block composed of a hydrophilic vinyl ether having an anionic hydrophilic group in this order because the affinity of the polymer dispersant for the polyoxyethylene castor oil or polyoxyethylene hardened castor oil is further improved.

The polymer dispersant preferably used in the present invention preferably has a repeating unit structure represented by the following general formula (a):

As the block having the hydrophobic group, $R^1$ in the general formula (a) denotes an aliphatic hydrocarbon group such as an alkyl, alkenyl, cycloalkyl or cycloalkenyl group, or an aromatic hydrocarbon group, the carbon atom of which may be substituted by a nitrogen atom, such as a phenyl, pyridyl, benzyl, toluyl, xylyl, alkylphenyl, phenylalkylene, biphenyl or phenylpyridyl group. Hydrogen atoms on the aromatic ring may also be substituted by a hydrocarbon group. $R^1$ preferably has 1 to 18 carbon atoms.

Further, $R^1$ may also be represented by $—(CH_2)_m—(O)_n—R^4$. Here, $R^4$ denotes an aliphatic hydrocarbon group such as an alkyl, alkenyl, cycloalkyl or cycloalkenyl group, an aromatic hydrocarbon group (hydrogen atoms on the aromatic ring may also be substituted by a hydrocarbon group), the carbon atom of which may be substituted by a nitrogen atom, such as a phenyl, pyridyl, benzyl, toluyl, xylyl, alkylphenyl, phenylalkylene, biphenyl or phenylpyridyl group, —CHO, —CH$_2$CHO, —CO—CH=CH$_2$, —CO—C(CH$_3$)=CH$_2$, —CH$_2$—CH=CH$_2$, —CH$_2$—C(CH$_3$)=CH$_2$, or —CH$_2$—COOR$^5$. Hydrogen atoms in these groups may be substituted by halogen atoms such as fluorine, chlorine and bromine atoms within being chemically allowable. $R^4$ preferably has 1 to 18 carbon atoms. $R^5$ is hydrogen or an alkyl group. m is preferably from 1 to 36, and n is preferably 0 or 1.

As for the block composed of the vinyl ether having the nonionic hydrophilic group comprising at least an oxyethylene group, $R^1$ in the general formula (a) is represented by $—(CH(R^2)—CH(R^3)—O)_p—R^4$. In this formula, $R^2$ and $R^3$ are, independently of each other, hydrogen or a methyl group, and $R^4$ has the same meaning as defined above and denotes an aliphatic hydrocarbon group such as an alkyl, alkenyl, cycloalkyl or cycloalkenyl group, an aromatic hydrocarbon group (hydrogen atoms on the aromatic ring may also be substituted by a hydrocarbon group), the carbon atom of which may be substituted by a nitrogen atom, such as a phenyl, pyridyl, benzyl, toluyl, xylyl, alkylphenyl, phenylalkylene, biphenyl or phenylpyridyl group, —CHO, —CH$_2$CHO, —CO—CH=CH$_2$, —CO—C(CH$_3$)=CH$_2$, —CH$_2$—CH=CH$_2$, —CH$_2$—C(CH$_3$)=CH$_2$, or —CH$_2$—COOR$^5$. Hydrogen atoms in these groups may be substituted by halogen atoms such as fluorine, chlorine and bromine atoms within being chemically allowable. $R^4$ preferably has 1 to 18 carbon atoms. $R^5$ is hydrogen or an alkyl group. p is preferably from 1 to 18.

Examples of the alkyl and alkenyl groups of $R^1$ and $R^4$ in the above formula include methyl, ethyl, propyl, isopropyl, n-butyl, sec-butyl, t-butyl, pentyl, hexyl, heptyl, octyl, nonyl, decyl, dodecyl, tetradecyl, hexadecyl, octadecyl, oleyl and linoleyl groups, and examples of the cycloalkyl and cycloalkenyl groups include cyclopropyl, cyclobutyl, cyclopentyl, cyclohexyl, cyclooctyl and cyclohexenyl groups.

As for the block composed of the vinyl ether having the anionic hydrophilic group, $R^1$ in the general formula (a) is —$CH_2CH_2CH_2OCH_2COOH$, —$CH_2CH_5COOH$, —$CH_2COOH$ or —$(CH(R^2)$—$CH(R^3)$—$O)_p$—$R^5$—$COOH$. $R^2$ and $R^3$ have the same meanings as defined above and are, independently of each other, hydrogen or a methyl group, $R^5$ denotes a methylene, ethylene or phenylene group, and p is preferably from 1 to 18.

The structures of vinyl ether monomers (I-a to I-o) making up polymer dispersants preferably used in the present invention and the polymer dispersants (II-a to II-e) are illustrated below. However, the polyvinyl ether structures of the polymer dispersants used in the present invention are not limited thereto.

Further, the numbers l, m and n of the repeating units of the polyvinyl ether [in the above structures (II-a) to (II-e)] are preferably, independently of one another, from 1 to 10,000. In each of the structures (II-a) to (II-e), the total number of l+m+n is preferably from 10 to 20,000. The number average molecular weight thereof is preferably from 500 to 20,000, more, preferably from 1,000 to 5,000,000, most preferably from 2,000 to 2,000,000. The proportion of these polymer dispersants contained in the ink is preferably 0.1 to 20% by mass, more preferably 0.5 to 10% by mass based on the whole mass of the ink. The mass ratio of the water-insoluble coloring material to the polymer dispersant contained in the ink is desirably from 100:1 to 1:2 from the viewpoints of the ejection stability and storage stability of the ink.

When the polymer dispersant has an oxyethylene group, the total number (a) of oxyethylene units in the polyoxyethylene castor oil or polyoxyethylene hardened castor oil in the ink desirably falls within a range of from 0.1 to 25, preferably from 0.5 to 10 in terms of the ratio a/b of the total number (a) of oxyethylene units in the ink to the total number (b) of oxyethylene units in this polymer dispersant in the ink, because the affinity of the polymer dispersant for the polyoxyethylene castor oil or polyoxyethylene hardened castor oil is improved to more improve the fixability and color developing property of the ink on the surface of a recording material. Incidentally, the total number of oxyethylene units means the total number of oxyethylene units calculated out from the amount of each component used and is indicated by a product of the number of oxyethylene units in a molecule of each of them and the number of moles (amount used/molecular weight) of the molecule in the ink.

No particular limitation is imposed on a synthesizing process of the copolymer (polymer dispersant) having the vinyl ether type polymer block. However, cationic living polymerization by Aoshima et al. (Japanese Patent Application Laid-Open Nos. 11-322942 and 11-322866), or the like is preferably used. By using the cationic living polymerization process, various polymers such as homopolymers, copolymers composed of two or more monomers, block polymers, graft copolymers and graduation copolymers can be synthesized with their chain lengths (molecular weights) exactly made uniform. Further, for the polyvinyl ether, various functional groups can be introduced into side chains thereof.

As a neutralizing agent for the anionic hydrophilic group of the polymer dispersant, any neutralizing agent may be used so far as it can neutralize the anionic hydrophilic group of the polymer dispersant and is soluble in water. Examples of such a neutralizing agent include alkali metals such as lithium, sodium and potassium, amines such as monoethanolamine and triethanolamine, and ammonia, with lithium or sodium being preferred because the stability of the water-insoluble coloring material is more improved.

[Water-Soluble Organic Solvent]

As the water-soluble organic solvents used in the inks according to the present invention, any solvents may be used so far as they are organic solvents soluble in water, and a mixed solvent composed of 2 or more water-soluble organic solvents may also be used.

Specific examples of preferable water-soluble organic solvents include lower alcohols such as methyl alcohol, ethyl alcohol, n-propyl alcohol, isopropyl alcohol, n-butyl alcohol, sec-butyl alcohol and tert-butyl alcohol; diols such as ethylene glycol, diethylene glycol, triethylene glycol, tetraethylene glycol, propylene glycol, dipropylene glycol, tripropylene glycol, 1,2-butanediol, 1,3-butanediol, 1,4-butanediol, thiodiglycol and 1,4-cyclohexanediol; triols such as glycerol, 1,2,4-butanetriol, 1,2,6-hexanetriol and 1,2,5-pentanetriol; hindered alcohols such as trimethylol-propane, neopentyl glycol and pentaerythritol; glycol ethers such as ethylene glycol monomethyl ethers, ethylene glycol monoethyl ether, ethylene glycol monoisopropyl ether, ethylene glycol monoallyl ether, diethylene glycol methyl ether, diethylene glycol mono ethyl ether, diethylene glycol monobutyl ether, triethylene glycol monomethyl ether, triethylene glycol monoethyl ether, propylene glycol monomethyl ether and dipropylene glycol monomethyl ether; and besides dimethyl sulfoxide, glycerol monoallyl ether, N-methyl-2-pyrrolidone, 2-pyrrolidone, γ-butyrolactone, 1,3-dimethyl-2-imidazolidinone, sulfolane, β-dihydroxyethylurea, acetonylacetone, dimethylformamide, dimethylacetamide, acetone, diacetone alcohol, tetrahydrofuran and dioxane.

Among these, water-soluble organic solvents having a boiling point of 120° C. or higher are preferably used because the concentration of the ink at orifices is prevented. The proportion of these water-soluble organic solvents contained in the ink is preferably 5 to 50% by mass, more preferably 10 to 30% by mass based on the whole mass of the ink.

The above-described components are essential components for the ink-jet recording inks according to the present invention. However, various kinds of auxiliary components such as surfactants, pH adjustors, antioxidants and mildew-proofing agents may also be added in addition to the above-described components. Among others, polyethylene glycol or polypropylene glycol is preferably contained as an auxiliary component in the inks because the dispersion stability of the coloring material and the ejection stability of the inks are further improved. As such polyethylene glycol or polypropylene glycol, polyethylene glycol or polypropylene glycol, the number of oxyethylene or oxypropylene units in which falls within a range of from 10 to 30, is preferred. Further, the number (C) of oxyethylene or oxypropylene units in the polyethylene glycol or polypropylene glycol desirably falls within a range of from 0.1 to 2 in terms of the ratio C/A of the number (C) of oxyethylene units to the number (A) of oxyethylene units in the polyoxyethylene castor oil or polyoxyethylene hardened castor oil, because the dispersion stability of the coloring material during long-term storage, and the long-term ejection stability of the inks are improved.

The content of such polyethylene glycol or polypropylene glycol in the ink is preferably 0.5 to 10% by mass, more preferably 1 to 5% by mass based on the whole mass of the ink. In particular, the total number (c) of oxyethylene or oxypropylene units in the polyethylene glycol or polypropylene glycol contained in the ink desirably falls within a range of from 2 to 20 in terms of the ratio c/a of the total number (c) of oxyethylene units in the ink to the total number (a) of oxyethylene units in the polyoxyethylene castor oil or polyoxyethylene hardened castor oil contained in the ink, because the dispersion stability of the coloring material during long-term storage, and the long-term ejection stability of the inks are more improved.

The feature of the ink-jet recording method according to the present invention resides in that in an ink-jet recording method comprising applying energy to an ink to eject the ink thereby conducting recording, the above-described inks according to the present invention are used. As the energy, there may be used thermal energy or mechanical energy. However, the method using thermal energy is preferred.

In the ink-jet recording method according to the present invention, no limitation is imposed on recording materials. However, recording materials having an ink-receptive coating layer on at least one surface thereof, such as the so-called exclusive paper for ink-jet, postal cards, paper for business cards, paper for labels, corrugated cardboards and films for ink-jet, are preferably used. As the recording materials having the coating layer, are desired recording materials having, on at least one surface thereof, an ink-receptive coating layer containing at least a hydrophilic polymer and/or an inorganic porous material.

Ink-jet recording apparatus making use of the inks according to the present invention to conduct recording include household printers, in which A4-sized paper is mainly used, printers for business cards and cards, large-scale printers for business use, and the like. Exemplary preferable ink-jet recording apparatus will hereinafter be described.

[Ink-jet Recording Apparatus Utilizing Thermal Energy]

Figure 1:
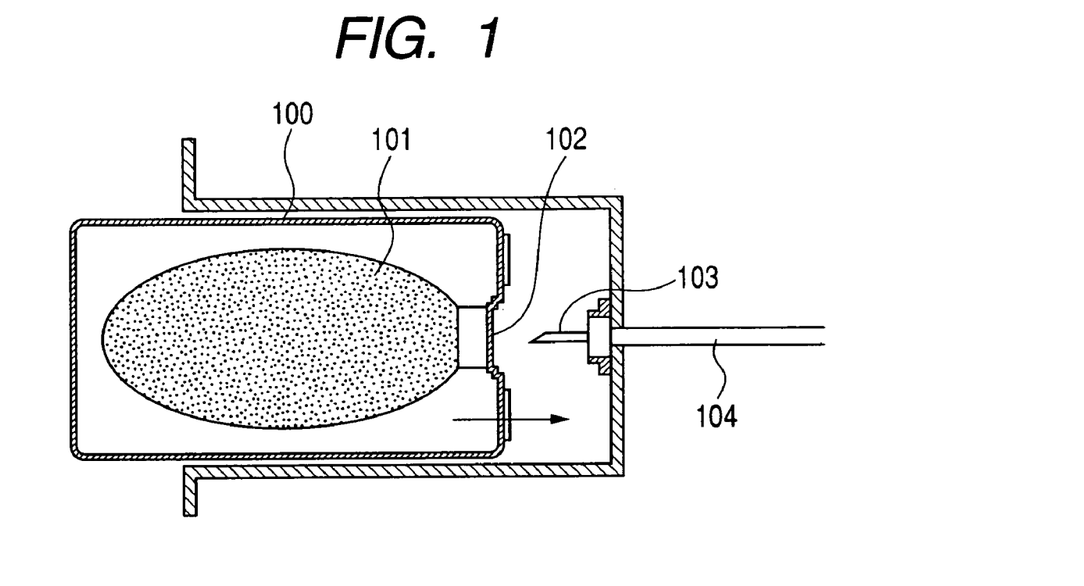
FIG. 1 is a typical drawing for illustrating the structure of an ink cartridge.

FIG. 1 illustrates an exemplary ink cartridge 100 in which an ink to be fed to a head through an ink-feeding tube 104 is stored. Here, reference numeral 101 designates an ink bag containing the ink to be fed. One end thereof is provided with a stopper 102 made of chlorinated butyl rubber. A needle 103 is inserted into this stopper 102, whereby the ink in the ink bag 101 is fed to a recording head (303, 304, 305 or 306) illustrated in FIG. 3. An ink-absorbing member for receiving a waste ink may also be provided within the ink cartridge. The ink-jet recording apparatus used in the present invention are not limited to the apparatus as described above, in which the recording head and the ink cartridge are separately provided, and a device in which these members are integrally formed may also be preferably used.

Figure 2:
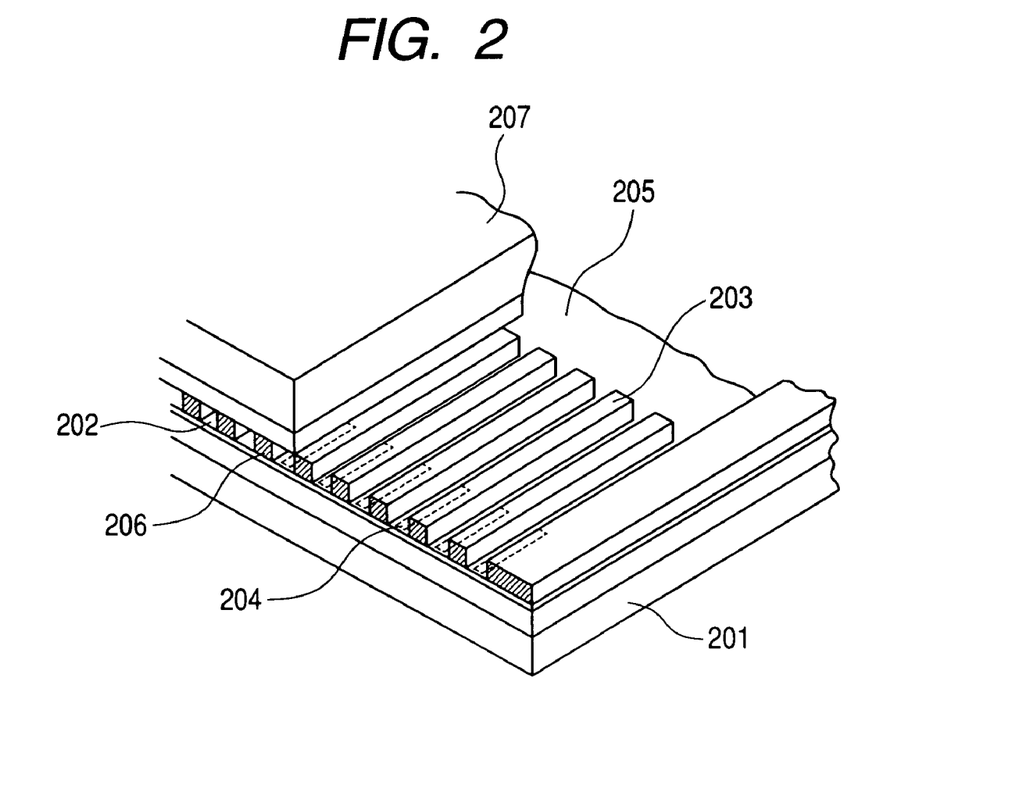
FIG. 2 is a typical drawing for illustrating the structure of an ink-jet recording head.

FIG. 2 is a typical drawing for illustrating the structure of an ink-jet recording head used in this embodiment. In each nozzle 202, its corresponding heater 204 is provided, a prescribed driving pulse is applied to the heater 204 from a recording-head-driving circuit, whereby the heater is heated to generate a bubble, and an ink droplet is ejected from an ejection opening 202 by the action thereof. Incidentally, the heater 204 is formed on a silicon substrate 206 by the same technique as a semiconductor production process. Reference numeral 201 indicates a base plate, 203 a nozzle partition wall forming each nozzle 202, 205 a common liquid chamber for feeding an ink to each nozzle 202, and 207 a top plate.

Figure 3:
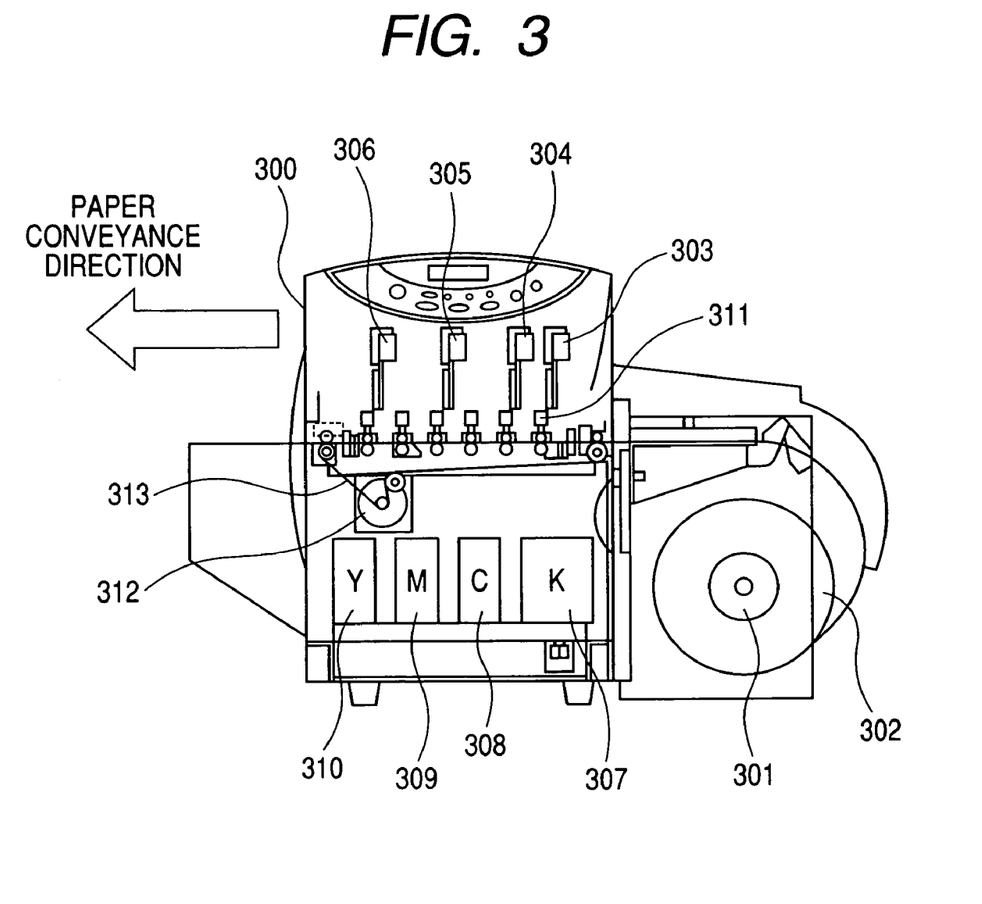
FIG. 3 is a perspective view of an ink-jet recording apparatus.

FIG. 3 is a partially perspective view illustrating a recording apparatus according to this embodiment. A recording material 302 in the recording apparatus 300 is fed from, for example, a roll feed unit 301 and continuously conveyed by a conveyance unit with which the body of the recording apparatus 300 is equipped. The conveyance unit is composed of a conveyance motor 312, a conveyance belt 313 and the like. Recording is conducted by starting ejection of a black ink from a recording head 303 for black at the time an image-forming position of the recording material passes under the recording head 303 for black, and selectively ejecting respective inks from recording heads 304, 305 and 306 for cyan, magenta and yellow in this order likewise to form a color image.

The recording apparatus 300 comprises a capping mechanism 311 for capping the respective recording heads during suspension of recording, ink cartridges 307 to 310 for feeding their corresponding inks to the recording heads 303 to 306, a pump unit (not illustrated) for feeding of the inks and recovery operation, a control board (not illustrated) for controlling the whole recording apparatus, and the like in addition to the above members.

Figure 4:
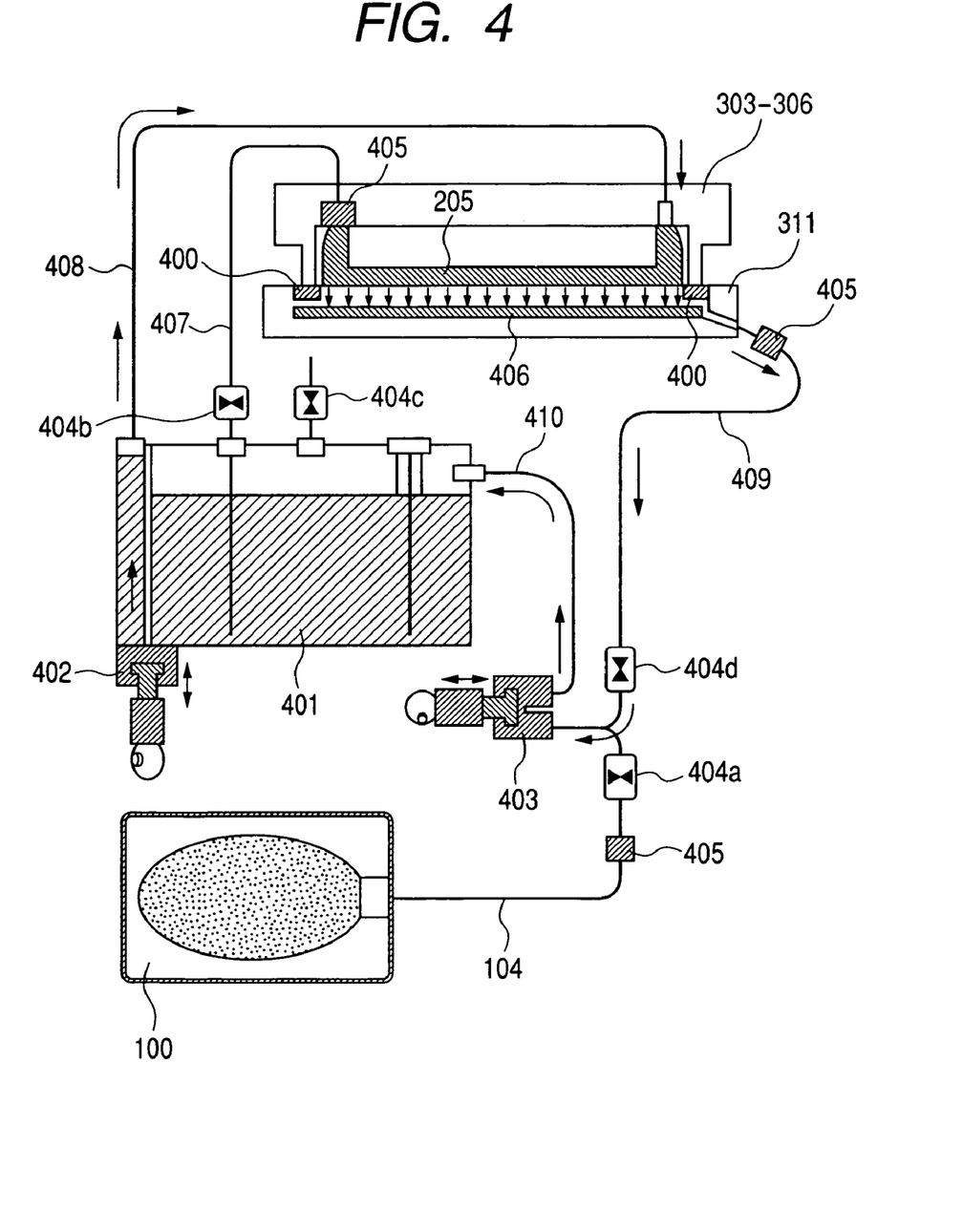
FIG. 4 is a schematic drawing of a recovering operation system in the ink-jet recording apparatus.

FIG. 4 is a schematic drawing of a recovering operation system in the ink-jet recording apparatus used in this embodiment. When the recording heads 303 to 306 are lowered, their ink ejection opening forming surfaces are brought into close contact with their corresponding caps 400 formed by chlorinated butyl rubber within the capping mechanism 311, whereby a prescribed recovery operation can be practiced.

An ink-recycling circuit part in the recovery operation system comprises, as principal elements, a subtank 401 connected to the ink cartridge 100, in which an ink to be supplied is stored in a polyethylene bag, through a suction pump 403 and the like, the suction pump 403, which is arranged in an ink feed line 409 formed by polyvinyl chloride and linking between the cap 400 and the subtank 401 to collect the ink from the capping mechanism 311 into the subtank 401, a filter 405 for removing dust and the like in the ink collected from the cap, a pressurizing pump 402 connected through an ink feed line 408 and feeding the ink to a common liquid chamber 205 for the recording heads 303 to 306, an ink feed line 407 feeding the ink returned from the recording head to the subtank 401, and valves 404a to 404d.

Upon cleaning of the recording heads 303 to 306, the recovery valve 404b is closed, and the pressurizing pump 402 is operated, whereby an ink is fed under pressure from the subtank 401 to the recording heads and forcedly discharged from nozzles 406. Bubbles, inks, dust and/or the like in the nozzles are thereby discharged. The suction pump 403 serves to collect the inks discharged from the recording heads within the capping mechanism 311 into the subtank 401.

[Ink-jet Recording Apparatus Utilizing Mechanical Energy]

As an exemplary preferable ink-jet recording apparatus utilizing mechanical energy, may be mentioned an On-Demand type ink-jet recording apparatus comprising a nozzle-forming substrate having a plurality of nozzles, pressure-generating elements composed of a piezoelectric material and an electrically conductive material provided in an opposing relation to the nozzles, and an ink filled around the pressure-generating elements, in which the pressure-generating elements are displaced by voltage applied to eject minute droplets of the ink from the nozzles. An example of the construction of a recording head, which is a principal part of such a recording apparatus, is illustrated in FIG. 5.

The head is composed of an ink flow path 80 communicating with an ink chamber (not illustrated), an orifice plate 81 through which ink droplets having a desired volume are ejected, a vibration plate 82 directly applying a pressure to the ink, a piezoelectric element 83 bonded to the vibration plate 82 and undergoing displacement according to an electric signal, and a substrate 84 adapted to support and fix the orifice plate 81, the vibration plate 82 and the like thereon.

Figure 5:
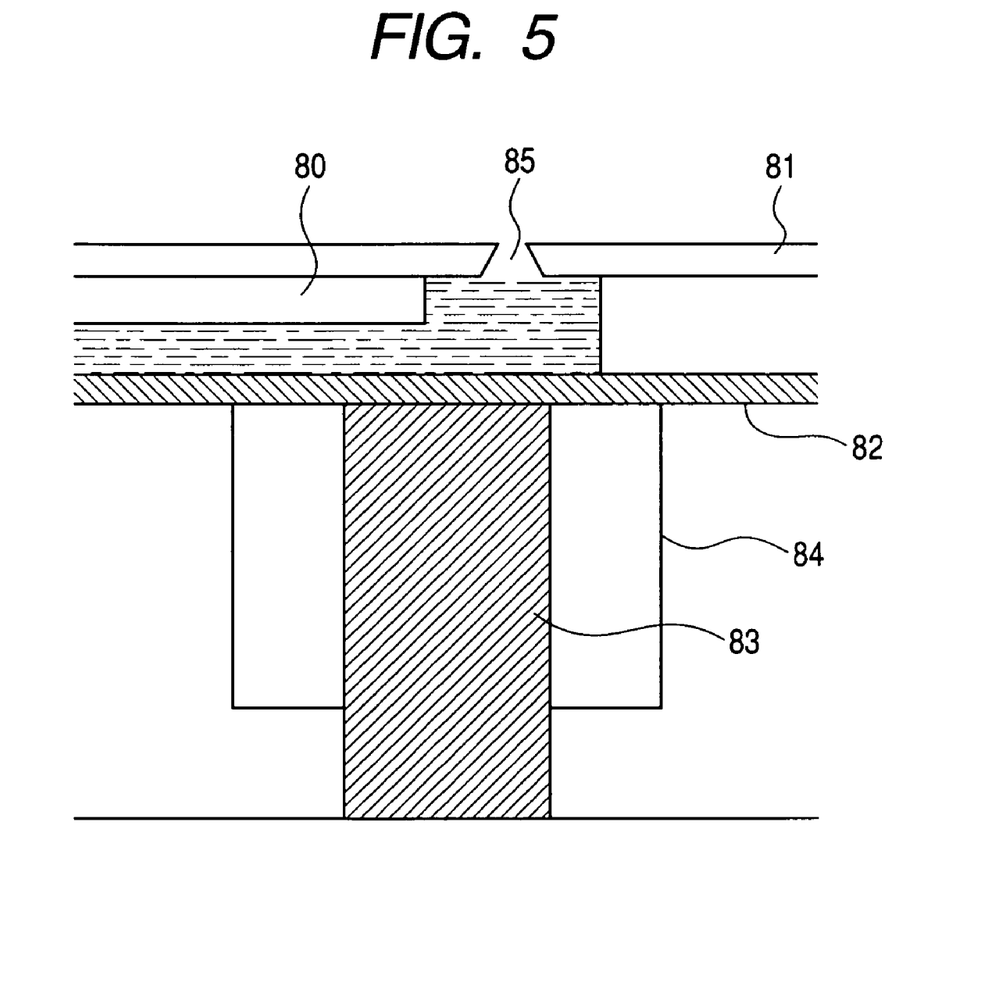
FIG. 5 is a schematic cross-sectional view illustrating the structure of another exemplary ink-jet recording head.

In FIG. 5, the ink flow path 80 is formed with a photosensitive resin or the like. The orifice plate 81 is made of a metal such as stainless steel or nickel, the ejection openings 85 of which are formed by electroforming, punching by press working, or the like. The vibration plate 82 is formed with a film of a metal such as stainless steel, nickel or titanium and a high-modulus resin film or the like. The piezoelectric element 83 is formed by a dielectric material such as barium titanate or PZT. The recording head having such constitution as described above is operated in such a manner that pulsed voltage is applied to the piezoelectric element 83 to generate a stress to cause distortion, the vibration plate 82 bonded to the piezoelectric element 83 is deformed by the energy of the stress, and the ink in the ink flow path 80 is thus perpendicularly pressurized to eject a droplet (not illustrated) of the ink from the ejection opening 85 of the orifice plate 81, thereby conducting recording.

The present invention will hereinafter be described in detail on the basis of the following Examples. However, the present invention is not limited to these examples. Incidentally, all designations of "part" or "parts" and "%" as will be used in the following examples mean part or parts by mass and % by mass unless expressly noted.

EXAMPLE 1

[Preparation of Coloring Material Dispersion I]

After 300 g of commercially available acid carbon black "Monarch 1300" (trade name, product of Cabot Co.) having a pH of 2.5 was fully mixed with 1,000 ml of water, 450 g of sodium hypochlorite was added dropwise to the resultant mixture, followed by stirring for 8 hours at 100 to 110° C. The thus-obtained slurry was diluted to a concentration of 1/10 with water, and its pH was adjusted with lithium hydroxide, and the thus-treated slurry was desalted and concentrated to a conductivity of 0.2 mS/cm by an ultrafilter membrane to prepare a black coloring material dispersion having a pigment concentration of 10%. After this dispersion was further subjected to a centrifugal treatment, it was filtered through a nylon filter having a pore size of 3 μm to remove coarse particles, thereby obtaining a black coloring material dispersion. The zeta potential of the coloring material dispersion thus obtained was −60 mV. The zeta potential was measured by an electrophoretic light scattering method (using a laser electrometer, "ELS-6000", trade name; manufactured by OTSUKA ELECTRONICS Co., Ltd.).

| [Preparation of Ink 1] | |
| --- | --- |
| Coloring Material Dispersion I | 50.0 parts |
| Polyoxyethylene castor oil (the number of oxyethylene units: 10) of the formula 1 | 5.0 parts |
| Glycerol | 5.0 parts |
| Diethylene glycol | 10.0 parts |
| Isopropyl alcohol | 3.0 parts |
| Ion-exchanged water | 27.0 parts. |

After the above components were mixed and thoroughly stirred, the resultant mixture was filtered through a microfilter having a pore size of 3 μm to obtain the intended ink.

EXAMPLE 2

[Preparation of Polymer Dispersant A]

A glass-made 4-necked flask equipped with a reflux tube, a dropping funnel, a thermometer and a stiffer was charged with 300 parts of methyl ethyl ketone, and heated with stirring until reflux through the reflux tube was steadily conducted. The internal temperature at this time was 84° C. A mixed solution of 20 parts of tert-octyl methacrylate, 180 parts of triethylene glycol ethyl ether acrylate, 40 parts of methacrylic acid and 4 parts of a polymerization initiator ("ABN-E", trade name; product of Wako Pure Chemical Industries, Ltd.) was added dropwise to this solution at an equal velocity over 180 minutes. After aging was conducted for 30 minutes, a mixed solution of 100 parts of methyl ethyl ketone and 2 parts of ABN-E was added dropwise at an equal velocity over 120 minutes. After completion of the drop addition, the internal temperature was retained for 60 minutes and then lowered, and 100 parts of methyl ethyl ketone was added to the reaction mixture to prepare a polymer dispersant. Incidentally, the weight average molecular weight of the thus-obtained polymer dispersant was 15,000, and the average number (B) of oxyethylene units in the polymer dispersant was 100.

[Preparation of Coloring Material Dispersion II]

After a methyl ethyl ketone solution of the above-prepared Polymer Dispersant A and C.I. Pigment Blue 15:3 that is a commercially available pigment were charged into a kneader having a twin screw and uniformly kneaded, the pressure was reduced while keeping the internal temperature at 80° C., thereby distilling off the solvent. The thus-obtained kneaded product was formed into a sheet by means of a twin roll, the sheet was transferred to a container, and prescribed amounts of ion-exchanged water and sodium hydroxide as a neutralizing agent were added. The resultant mixture was stirred to obtain Coloring Material Dispersion II having a pigment concentration of 10% and a polymer dispersant concentration of 10%.

| [Preparation of Ink 2] | |
| --- | --- |
| Coloring Material Dispersion II | 10.0 parts |
| Polyoxyethylene castor oil (the number of oxyethylene units: 10) of the formula 1 | 0.1 part |
| Glycerol | 5.0 parts |
| Diethylene glycol | 10.0 parts |
| Isopropyl alcohol | 3.0 parts |
| Ion-exchanged water | 71.9 parts. |

After the above components were mixed and thoroughly stirred, the resultant mixture was filtered through a microfilter having a pore size of 3 μm to obtain the intended ink.

EXAMPLE 3

[Preparation of Polymer Dispersant B]

A glass-made 4-necked flask equipped with a reflux tube, a dropping funnel, a thermometer and a stiffer was charged with 300 parts of methyl ethyl ketone, and heated with stirring until reflux through the reflux tube was steadily conducted. The internal temperature at this time was 84 C. A mixed solution of 34 parts of octadecyl methacrylate, 17 parts of diethylene glycol methyl ether acrylate, 40 parts of methacrylic acid and 4 parts of a polymerization initiator ("ABN-E", trade name; product of Wako Pure Chemical Industries, Ltd.) was added dropwise to this solution at an equal velocity over 180 minutes. After aging was conducted for 30 minutes, a mixed solution of 100 parts of methyl ethyl ketone and 2 parts of ABN-E was added dropwise at an equal velocity over 120 minutes. After completion of the drop addition, the internal temperature was retained for 60 minutes and then lowered, and 100 parts of methyl ethyl ketone was added to the reaction mixture to prepare a polymer dispersant. Incidentally, the weight average molecular weight of the thus-obtained polymer dispersant was 12,000, and the average number of oxyethylene units in the polymer dispersant was 20.

[Preparation of Coloring Material Dispersion III]

After a methyl ethyl ketone solution of the above-prepared Polymer Dispersant B and C.I. Pigment Blue 15:3 that is a commercially available pigment were charged into a kneader having a twin screw and uniformly kneaded, the pressure was reduced while keeping the internal temperature at 80° C., thereby distilling off the solvent. The thus-obtained kneaded product was formed into a sheet by means of a twin roll, the sheet was transferred to a container, and prescribed amounts of ion-exchanged water and sodium hydroxide as a neutralizing agent were added. The resultant mixture was stirred to obtain Coloring Material Dispersion III having a pigment concentration of 16% and a polymer dispersant concentration of 2%.

| [Preparation of Ink 3] | |
|---|---|
| Coloring Material Dispersion III | 25.0 parts |
| Polyoxyethylene hardened castor oil (the number of oxyethylene units: 100) of the formula 2 | 1.1 parts |
| Glycerol | 5.0 parts |
| Diethylene glycol | 10.0 parts |
| Isopropyl alcohol | 3.0 parts |
| Ion-exchanged water | 55.9 parts. |

After the above components were mixed and thoroughly stirred, the resultant mixture was filtered through a microfilter having a pore size of 3 μm to obtain the intended ink.

EXAMPLE 4

[Preparation of Polymer Dispersant C]

Synthesis of AB Type Diblock Copolymer Composed of Hydrophobic Block and Hydrophilic Block:

After the interior of a glass container equipped with a three-way stop-cock was purged with nitrogen, the container was heated to 250° C. under a nitrogen gas atmosphere to remove adsorbed water. After the system was returned to room temperature, 12 mmol of isobutyl vinyl ether, 16 mmol of ethyl acetate, 0.1 mmol of 1-isobutoxyethyl acetate and 11 cm$^3$ of toluene were added. At the time the temperature within the system had reached 0° C., 0.2 mmol of ethylaluminum sesquichloride was added to initiate polymerization, thereby synthesizing a block A of an AB type diblock copolymer.

After the molecular weight was periodically monitored by means of gel permeation chromatography (GPC) to confirm completion of the polymerization of the block A, 24 mmol of a vinyl monomer obtained by silylating the hydroxyl group of 2-(2-hydroxyethoxy)ethylvinylether (block B) with trimethylchlorosilane was added to conduct synthesis. The termination of the polymerization reaction was conducted by adding a 0.3% solution of ammonia/methanol into the system, and hydrolysis of the hydroxyl group silylated with trimethylchlorosilane was conducted by adding water. Dichloromethane was added into the reaction mixture solution after completion of the reaction to dilute the solution, and the diluted solution was washed 3 times with 0.6N hydrochloric acid and then 3 times with distilled water, and concentrated and dried to solids by an evaporator. The thus-obtained solids were vacuum-dried to obtain an AB type diblock copolymer (Polymer Dispersant C). The identification of the compound was conducted by means of NMR and GPC. Mn was $3.6\times10^4$, and Mw/Mn was 1.2. Incidentally, the average number of oxyethylene units in the polymer dispersant was 400.

[Preparation of Coloring Material Dispersion IV]

Twelve parts of C.I. Pigment Blue 15:3 that is a commercially available pigment was mixed with 90.0 parts of tetrahydrofuran, and the mixture was heated to 40° C. and fully stirred so as to prepare a uniform solution. After this solution was added to and mixed with a solution with 10.0 parts of the above-prepared Polymer Dispersant C dissolved in 90.0 parts of tetrahydrofuran, 78.0 parts of water was added to the resultant mixture. Tetrahydrofuran was then removed by a rotary evaporator to obtain Coloring Material Dispersion IV having a pigment concentration of 12% and a polymer dispersant concentration of 10%.

| [Preparation of Ink 4] | |
|---|---|
| Coloring Material Dispersion IV | 25.0 parts |
| Polyoxyethylene hardened castor oil (the number of oxyethylene units: 60) of the formula 2 | 2.0 parts |
| Glycerol | 5.0 parts |
| Diethylene glycol | 10.0 parts |
| Isopropyl alcohol | 3.0 parts |
| Polyethylene glycol (the number of oxyethylene units: 10) | 1.0 part |
| Ion-exchanged water | 54.0 parts. |

After the above components were mixed and thoroughly stirred, the resultant mixture was filtered through a microfilter having a pore size of 3 μm to obtain the intended ink.

EXAMPLE 5

[Preparation of Polymer Dispersant D]

Synthesis of ABC Type Triblock Copolymer Composed of Hydrophobic Block and 2 Hydrophilic Blocks:

After the interior of a glass container equipped with a three-way stop-cock was purged with nitrogen, the container was heated to 250° C. under a nitrogen gas atmosphere to remove adsorbed water. After the system was returned to room temperature, 12 mmol of n-octadecyl vinyl ether, 16 mmol of ethyl acetate, 0.1 mmol of 1-isobutoxyethyl acetate and 11 cm$^3$ of toluene were added. At the time the temperature within the system had reached 0° C., 0.2 mmol of ethylaluminum sesquichloride was added to initiate polymerization to initiate polymerization, thereby synthesizing a component A of an ABC type triblock copolymer.

After the molecular weight was periodically monitored by means of gel permeation chromatography (GPC) to confirm completion of the polymerization of the component A, 25 mmol of 2-(2-(2-(2-methoxyethoxy)ethoxy)-ethoxy)ethylvinylether (component B) was added to continue the polymerization. After the molecular weight was monitored by means of GPC likewise to confirm completion of the polymerization of the component B, 12 mmol of a vinyl monomer obtained by esterifying the carboxyl group of 6-(2-vinyloxyethoxy)hexanoic acid (component C) with an ethyl group was added to conduct synthesis. The termination of the polymerization reaction was conducted by adding a 0.3% solution of ammonia/methanol into the system, and the carboxyl group esterified was hydrolyzed into a carboxylic acid form with a solution of sodium hydroxide/methanol. The subsequent process was performed in the same manner as in EXAMPLE 4 to obtain an ABC type triblock copolymer (Polymer Dispersant D). The identification of the compound was conducted by means of NMR and GPC. Mn was $3.7\times10^4$, and Mw/Mn was 1.2. Incidentally, the average number of oxyethylene units in the polymer dispersant was 100.

[Preparation of Coloring Material Dispersion V]

Twelve parts of C.I. Pigment Red 122 that is a commercially available pigment was mixed with 90.0 parts of tetrahydrofuran, and the mixture was heated to 40° C. and fully stirred so as to prepare a uniform solution. After this solution was added to and mixed with a solution with 8.0 parts of the above-prepared Polymer Dispersant D dissolved in 90.0 parts of tetrahydrofuran, 80.0 parts of an aqueous solution of sodium hydroxide containing sodium in an equivalent amount as a neutralizing agent for the anionic hydrophilic group in the polymer dispersant was added to the resultant mixture. Tetrahydrofuran was then removed by a rotary evaporator to obtain Coloring Material Dispersion V having a pigment concentration of 12% and a polymer dispersant concentration of 8%.

[Preparation of Ink 5]

| | |
|---|---|
| Coloring Material Dispersion V | 25.0 parts |
| Polyoxyethylene hardened castor oil (the number of oxyethylene units: 20) of the formula 2 | 0.25 part |
| Glycerol | 8.0 parts |
| Ethylene glycol | 8.0 parts |
| Triethylene glycol | 6.5 parts |
| Polypropylene glycol (the number of oxypropylene units: 35) | 5.0 parts |
| Ion-exchanged water | 47.25 parts. |

After the above components were mixed and thoroughly stirred, the resultant mixture was filtered through a microfilter having a pore size of 3 µm to obtain the intended ink.

EXAMPLE 6

[Preparation of Polymer Dispersant E]

Synthesis of ABC Type Triblock Copolymer Composed of Hydrophobic Block and 2 Hydrophilic Blocks:

An ABC type triblock copolymer (Polymer Dispersant E) was obtained in the same manner as in EXAMPLE 5 except that the amount of 2-(2-(2-(2-methoxyethoxy)ethoxy)-ethoxy)ethylvinylether added as the component B was changed to 8 mmol. The identification of the compound was conducted by means of NMR and GPC. Mn was $3.3 \times 10^4$, and Mw/Mn was 1.1. Incidentally, the average number of oxyethylene units in the polymer dispersant was 30.

[Preparation of Coloring Material Dispersion VI]

Ten parts of C.I. Pigment Yellow 93 that is a commercially available pigment was mixed with 90.0 parts of tetrahydrofuran, and the mixture was heated to 40° C. and fully stirred so as to prepare a uniform solution. After this solution was added to and mixed with a solution with 10.0 parts of the above-prepared Polymer Dispersant E dissolved in 90.0 parts of tetrahydrofuran, 80.0 parts of an aqueous solution of lithium hydroxide containing lithium in an equivalent amount as a neutralizing agent for the anionic hydrophilic group in the polymer dispersant was added to the resultant mixture. Tetrahydrofuran was then removed by a rotary evaporator to obtain Coloring Material Dispersion VI having a pigment concentration of 10% and a polymer dispersant concentration of 10%.

[Preparation of Ink 6]

| | |
|---|---|
| Coloring Material Dispersion VI | 40.0 parts |
| Polyoxyethylene castor oil (the number of oxyethylene units: 60) of the formula 1 | 2.0 parts |
| Glycerol | 8.0 parts |
| Ethylene glycol | 8.0 parts |
| Triethylene glycol | 6.5 parts |
| Polypropylene glycol (the number of oxypropylene units: 16) | 4.0 parts |
| Ion-exchanged water | 31.5 parts. |

After the above components were mixed and thoroughly stirred, the resultant mixture was filtered through a microfilter having a pore size of 3 µm to obtain the intended ink.

EXAMPLE 7

[Preparation of Polymer Dispersant F]

Synthesis of ABC Type Triblock Copolymer Composed of Hydrophobic Block and 2 Hydrophilic Blocks:

An ABC type triblock copolymer (Polymer Dispersant F) was obtained in the same manner as in EXAMPLE 5 except that the amount of 2-(2-(2-(2-methoxyethoxy)ethoxy)-ethoxy)ethylvinylether added as the component B was changed to 35 mmol. The identification of the compound was conducted by means of NMR and GPC. Mn was $3.8 \times 10^4$, and Mw/Mn was 1.3. Incidentally, the average number of oxyethylene units in the polymer dispersant was 140.

[Preparation of Coloring Material Dispersion VII]

Sixteen parts of carbon black ("MA100", trade name; product of Mitsubishi Chemical Corporation) that is a commercially available pigment was mixed with 90.0 parts of tetrahydrofuran, and the mixture was heated to 40° C. and fully stirred so as to prepare a uniform solution. After this solution was added to and mixed with a solution with 4.0 parts of the above-prepared Polymer Dispersant F dissolved in 90.0 parts of tetrahydrofuran, 80.0 parts of an aqueous solution of lithium hydroxide containing lithium in an equivalent amount as a neutralizing agent for the anionic hydrophilic group in the polymer dispersant was added to the resultant mixture. Tetrahydrofuran was then removed by a rotary evaporator to obtain Coloring Material Dispersion VII having a pigment concentration of 16% and a polymer dispersant concentration of 4%.

[Preparation of Ink 7]

| | |
|---|---|
| Coloring Material Dispersion VII | 25.0 parts |
| Polyoxyethylene castor oil (the number of oxyethylene units: 40) of the formula 1 | 1.0 part |
| Glycerol | 6.0 parts |
| Triethylene glycol | 6.0 parts |
| Trimethylolpropane | 6.0 parts |
| Polypropylene glycol (the number of oxypropylene units: 33) | 4.0 parts |
| Ion-exchanged water | 52.0 parts. |

After the above components were mixed and thoroughly stirred, the resultant mixture was filtered through a microfilter having a pore size of 3 µm to obtain the intended ink.

EXAMPLE 8

[Preparation of Polymer Dispersant G]

Synthesis of ABC Type Triblock Copolymer Composed of Hydrophobic Block and 2 Hydrophilic Blocks:

An ABC type triblock copolymer (Polymer Dispersant G) was obtained in the same manner as in EXAMPLE 5 except that the amount of 2-(2-(2-(2-methoxyethoxy)ethoxy)-ethoxy) ethylvinylether added as the component B was changed to 5 mmol. The identification of the compound was conducted by means of NMR and GPC. Mn was $3.1 \times 10^4$, and Mw/Mn was 1.1. Incidentally, the average number of oxyethylene units in the polymer dispersant was 20.

[Preparation of Coloring Material Dispersion VIII]

Twelve parts of C.I. Pigment Blue 15:3 that is a commercially available pigment was mixed with 90.0 parts of tetrahydrofuran, and the mixture was heated to 40° C. and fully stirred so as to prepare a uniform solution. After this solution was added to and mixed with a solution with 10.0 parts of the above-prepared Polymer Dispersant G dissolved in 90.0 parts of tetrahydrofuran, 78.0 parts of an aqueous solution of lithium hydroxide containing lithium in an equivalent amount as a neutralizing agent for the anionic hydrophilic group in the polymer dispersant was added to the resultant mixture. Tetrahydrofuran was then removed by a rotary evaporator to obtain Coloring Material Dispersion VIII having a pigment concentration of 12% and a polymer dispersant concentration of 10%.

| [Preparation of Ink 8] | |
| --- | --- |
| Coloring Material Dispersion VIII | 25.0 parts |
| Polyoxyethylene hardened castor oil (the number of oxyethylene units: 20) of the formula 2 | 0.35 part |
| Glycerol | 6.0 parts |
| Triethylene glycol | 6.0 parts |
| Trimethylolpropane | 6.0 parts |
| Polyethylene glycol (the number of oxyethylene units: 33) | 3.0 parts |
| Ion-exchanged water | 53.65 parts. |

After the above components were mixed and thoroughly stirred, the resultant mixture was filtered through a microfilter having a pore size of 3 µm to obtain the intended ink.

EXAMPLE 9

[Preparation of Coloring Material Dispersion IX]

Twelve parts of C.I. Pigment Blue 15:3 that is a commercially available pigment was mixed with 90.0 parts of tetrahydrofuran, and the mixture was heated to 40° C. and fully stirred so as to prepare a uniform solution. After this solution was added to and mixed with a solution with 4.0 parts of the Polymer Dispersant G obtained in EXAMPLE 8 dissolved in 90.0 parts of tetrahydrofuran, 84.0 parts of an aqueous solution of sodium hydroxide containing sodium in an equivalent amount as a neutralizing agent for the anionic hydrophilic group in the polymer dispersant was added to the resultant mixture. Tetrahydrofuran was then removed by a rotary evaporator to obtain Coloring Material Dispersion IX having a pigment concentration of 12% and a polymer dispersant concentration of 4%.

| [Preparation of Ink 9] | |
| --- | --- |
| Coloring Material Dispersion IX | 25.0 parts |
| Polyoxyethylene hardened castor oil (the number of oxyethylene units: 20) of the formula 2 | 0.5 part |
| Glycerol | 6.0 parts |
| Triethylene glycol | 6.0 parts |
| Trimethylolpropane | 6.0 parts |
| Polyethylene glycol (the number of oxyethylene units: 21) | 1.0 part |
| Ion-exchanged water | 55.5 parts. |

After the above components were mixed and thoroughly stirred, the resultant mixture was filtered through a microfilter having a pore size of 3 µm to obtain the intended ink.

EXAMPLE 10

[Preparation of Coloring Material Dispersion X]

Twelve parts of C.I. Pigment Blue 15:3 that is a commercially available pigment was mixed with 90.0 parts of tetrahydrofuran in a container, and the mixture was heated to 40° C. and fully stirred so as to prepare a uniform solution. After this solution was added to and mixed with a solution with 16.0 parts of the Polymer Dispersant G obtained in EXAMPLE 8 dissolved in 90.0 parts of tetrahydrofuran, 72.0 parts of an aqueous solution of sodium hydroxide containing sodium in an equivalent amount as a neutralizing agent for the anionic hydrophilic group in the polymer dispersant was added to the resultant mixture. Tetrahydrofuran was then removed by a rotary evaporator to obtain Coloring Material Dispersion X having a pigment concentration of 12% and a polymer dispersant concentration of 16%.

| [Preparation of Ink 10] | |
| --- | --- |
| Coloring Material Dispersion X | 25.0 parts |
| Polyoxyethylene castor oil (the number of oxyethylene units: 40) of the formula 1 | 0.25 part |
| Polyoxyethylene hardened castor oil (the number of oxyethylene units: 40) of the formula 2 | 0.25 part |
| Glycerol | 6.0 parts |
| Triethylene glycol | 6.0 parts |
| Trimethylolpropane | 6.0 parts |
| Polyethylene glycol (the number of oxyethylene units: 10) | 5.0 parts |
| Ion-exchanged water | 51.5 parts. |

After the above components were mixed and thoroughly stirred, the resultant mixture was filtered through a microfilter having a pore size of 3 µm to obtain the intended ink.

COMPARATIVE EXAMPLE 1

| [Preparation of Ink 11] | | |
| --- | --- | --- |
| Coloring Material Dispersion I | 50.0 | parts |
| Glycerol | 5.0 | parts |
| Diethylene glycol | 10.0 | parts |
| Isopropyl alcohol | 3.0 | parts |
| Ion-exchanged water | 32.0 | parts. |

After the above components were mixed and thoroughly stirred, the resultant mixture was filtered through a microfilter having a pore size of 3 µm to obtain an ink.

COMPARATIVE EXAMPLE 2

| [Preparation of Ink 12] | | |
| --- | --- | --- |
| Coloring Material Dispersion II | 10.0 | parts |
| Glycerol | 5.0 | parts |
| Diethylene glycol | 10.0 | parts |

-continued

[Preparation of Ink 12]

| Isopropyl alcohol | 3.0 parts |
|---|---|
| Ion-exchanged water | 72.0 parts. |

After the above components were mixed and thoroughly stirred, the resultant mixture was filtered through a microfilter having a pore size of 3 μm to obtain an ink.

COMPARATIVE EXAMPLE 3

[Preparation of Ink 13]

| Coloring Material Dispersion II | 10.0 parts |
|---|---|
| Glycerol | 5.0 parts |
| Diethylene glycol | 10.0 parts |
| Isopropyl alcohol | 3.0 parts |
| Polyethylene glycol (the number of oxyethylene units: 10) | 1.0 part |
| Ion-exchanged water | 71.0 parts. |

After the above components were mixed and thoroughly stirred, the resultant mixture was filtered through a microfilter having a pore size of 3 μm to obtain an ink.

COMPARATIVE EXAMPLE 4

[Preparation of Ink 14]

| Coloring Material Dispersion I | 50.0 parts |
|---|---|
| Glycerol | 5.0 parts |
| Diethylene glycol | 10.0 parts |
| Isopropyl alcohol | 3.0 parts |
| Polyoxyethylene sorbitan monooleate (the number of oxyethylene units: 20) | 5.0 parts |
| Ion-exchanged water | 27.0 parts. |

After the above components were mixed and thoroughly stirred, the resultant mixture was filtered through a microfilter having a pore size of 3 μm to obtain an ink.

COMPARATIVE EXAMPLE 5

[Preparation of Ink 15]

| Coloring Material Dispersion II | 10.0 parts |
|---|---|
| Glycerol | 5.0 parts |
| Diethylene glycol | 10.0 parts |
| Isopropyl alcohol | 3.0 parts |
| Polyoxyethylene dodecyl ether (the number of oxyethylene units: 10) | 0.1 part |
| Ion-exchanged water | 71.9 parts. |

After the above components were mixed and thoroughly stirred, the resultant mixture was filtered through a microfilter having a pore size of 3 μm to obtain an ink.

{Evaluation}

The inks according to EXAMPLES 1 to 10 and the inks according to COMPARATIVE EXAMPLES 1 to 5 were tested as to dispersion stability, ejection properties, color developing property and abrasion resistance. Incidentally, the color developing property, abrasion resistance and ejection properties were evaluated by charging each of the inks into an ink-jet recording apparatus, P-660CII, (trade name; manufactured by Canon Finetech Co., Ltd.) having an On-Demand type multi-recording head that ejects ink by applying thermal energy in response to recording signals to the ink, to conduct printing on glossy paper SP101 (trade name; product of Canon Inc.). As a result, all the inks according to EXAMPLES exhibited good results as to the dispersion stability and ejection stability compared with the inks according to COMPARATIVE EXAMPLES as shown in Table 1. All the inks according to EXAMPLES also exhibited good results as to the coloring and abrasion resistance of printed images.

TABLE 1

| | Oxyethylene group ratio *1 | Dispersion stability *2 | Intermittent ejection stability *3 | Continuous ejection stability *4 | Color developing property *5 | Abrasion resistance *6 |
|---|---|---|---|---|---|---|
| EX. 1 | — | B | B | B | B | B |
| EX. 2 | 0.1 | A | B | B | A | B |
| EX. 3 | 5.0 | A | B | B | A | B |
| EX. 4 | 0.2 | A | A | B | A | B |
| EX. 5 | 0.2 | A | A | B | A | A |
| EX. 6 | 2.0 | A | A | A | A | A |
| EX. 7 | 0.3 | A | A | A | A | A |
| EX. 8 | 1.0 | A | A | A | A | A |
| EX. 9 | 1.0 | A | A | A | A | A |
| EX. 10 | 2.0 | A | A | A | A | A |
| COMP. EX. 1 | — | B | B | B | D | D |
| COMP. EX. 2 | — | C | D | D | C | C |
| COMP. EX. 3 | — | C | B | D | B | C |
| COMP. | — | B | B | C | D | D |

TABLE 1-continued

| | Oxyethylene group ratio *1 | Dispersion stability *2 | Intermittent ejection stability *3 | Continuous ejection stability *4 | Color developing property *5 | Abrasion resistance *6 |
|---|---|---|---|---|---|---|
| EX. 4 | | | | | | |
| COMP. EX. 5 | — | B | B | C | C | C |

*1: Oxyethylene group ratio
The value obtained by calculating out an oxyethylene group ratio between the polyoxyethylene castor oil or polyoxyethylene hardened castor oil and the polymer dispersant in the following manner.
Oxyethylene group ratio = (the number of oxyethylene units in the polyoxyethylene castor oil or polyoxyethylene hardened castor oil)/(the number of oxyethylene units in the polymer dispersant).

*2: Dispersion stability
Each ink was heated at 100° C. for 4 hours to test the ink after the heating as to heat stability. Particle diameters before and after the heating were measured to determine rate of particle diameter increase (%) in accordance with the following equation, thereby giving an index to the dispersion stability. The measurement of the particle diameters was conducted by means of a dynamic light scattering method (using a laser particle diameter analysis system, PAR III, trade name; manufactured by OTSUKA ELECTRONICS Co., Ltd.). The evaluation standard is as follows.
Percent increase (%) in particle diameter = [(Particle diameter after heating) − (Particle diameter before heating)]/(Particle diameter before heating) × 100
A: Rate of particle diameter increase (%) is lower than 5%;
B: Rate of particle diameter increase (%) is not lower than 5%, but lower than 10%;
C: Rate of particle diameter increase (%) is not lower than 10%, but lower than 30%;
D: Rate of particle diameter increase (%) is not lower than 30%.

*3: Intermittent ejection stability
After each ink was stored at 60° C. for 2 months, a 100% solid image was printed under an environment of 15° C. and 10% in humidity, and the printing was suspended for 3 minutes. Thereafter, a 100% solid image was printed again to evaluate this image in accordance with the following standard.
A: No white stripe is observed, and printing is normally conducted;
B: White stripes are slightly observed at an initial portion of the printing;
C: White stripes are observed on the whole image;
D: The image is scarcely printed.

*4: Continuous ejection stability
A postal card-sized gradation pattern was continuously printed on 1,000 sheets of the gloss paper to evaluate the image on the thousandth sheet about whether dot misalignment and ejection failure occurred or not in accordance with the following standard.
A: Neither dot misalignment nor ejection failure is observed, and printing is normally conducted;
B: No ejection failure occurs, but dot misalignment is partly observed;
C: Ejection failure partly occurs, and dot misalignment is observed on the whole image;
D: Ejection failure occurs in plenty, and dot misalignment is observed on the whole image.

*5: Color developing property
An image was printed with each ink stored at 60° C. for 2 months, and this image was evaluated in accordance with the following standard.
A: No blur is observed, and saturation is high;
B: No blur is observed, but saturation is somewhat low;
C: Blurs are observed;
D: Blurs are observed in plenty, and saturation is also low.

*6: Abrasion resistance
After a printed surface was sprayed with tap water after a print was left to stand for at least 12 hours after printing, Kimwipes were placed on the printed surface, and additionally, a weight of 500 g/12.56 $cm^2$ was placed thereon and reciprocated 5 times. After this, the degree of stain at a blank portion and abrasion of a solid-image- and/or character-printed portion was evaluated in accordance with the following standard.
A: No stain is observed on the blank portion at all, and no abrasion is also observed on the solid-image- and/or character-printed portion;
B: Stain is scarcely observed on the blank portion, and no abrasion is observed on the solid-image- and/or character-printed portion;
C: Stain is somewhat observed on the blank portion, and an abraded mark is somewhat observed on the solid-image- and/or character-printed portion;
D: Stain is observed on the blank portion, and the solid-image- and/or character-printed portion is partly abraded off.

As has been described above, according to the present invention, there can be provided ink-jet water-based inks that can stably record images having high fastness properties and excellent quality over a long period of time in all cases. In addition, an ink-jet recording method and ink-jet recording apparatus, by which images having excellent fastness properties and quality can be recorded, can be provided.

While the invention has been described with reference to the preferred embodiments disclosed herein, it is not confined to the details set forth and this application is intended to cover such modifications or changes as may come within the purpose of the improvements or the scope of the appended claims.

This application claims priority benefits of Japanese Patent Application No. 2005-053246 filed Feb. 28, 2005 the entire disclosure of which is incorporated herein by reference in its entirety.

What is claimed is:

1. An ink-jet water-based ink principally comprising a water-insoluble coloring material, a water-soluble organic solvent, an auxiliary component and water,
   wherein at least polyoxyethylene castor oil or polyoxyethylene hardened castor oil is contained as the auxiliary component,
   wherein the water-insoluble coloring material is a pigment, and the pigment is dispersed by a polymer dispersant,
   wherein the polymer dispersant is a polymeric compound composed of at least a monomer having an anionic hydrophilic group, a monomer having an oxyethylene group, and a monomer having a hydrophobic group, and
   wherein the ratio (A)/(B) of the number (A) of oxyethylene units in the polyoxyethylene castor oil or polyoxyethylene hardened castor oil to the number (B) of oxyethylene units in the polymer dispersant falls within a range of from 0.1 to 5, (A) and (B) being average numbers per molecule.

2. The ink-jet water-based ink according to claim 1, wherein polyethylene glycol or polypropylene glycol is further contained as another auxiliary component.

3. The ink-jet water-based ink according to claim 1, wherein the polymer dispersant is a block copolymer comprising a hydrophobic block composed of at least one vinyl ether and a hydrophilic block composed of at least one vinyl ether.

4. The ink-jet water-based ink according to claim 3, wherein the hydrophilic block of the polymer dispersant comprises a block composed of a vinyl ether having a nonionic hydrophilic group and a block composed of a vinyl ether having an anionic hydrophilic group.

5. The ink-jet water-based ink according to claim 3, wherein the polymer dispersant comprises a block composed of a hydrophobic vinyl ether, a block composed of a hydrophilic vinyl ether having a nonionic hydrophilic group and a block composed of a hydrophilic vinyl ether having an anionic hydrophilic group in this order.

6. An ink-jet recording method comprising applying energy to an ink to eject the ink, thereby applying the ink to a recording material to conduct recording, wherein the ink is the ink-jet water-based ink according to any one of claims 1 and 2 to 5.

7. The ink-jet recording method according to claim 6, wherein the energy is thermal energy.

8. The ink-jet recording method according to claim 6, wherein the recording material is a recording material having an ink-receptive coating layer on at least one surface thereof.

9. An ink cartridge comprising an ink-storing portion storing an ink, wherein the ink is the ink-jet water-based ink according to any one of claims 1 and 2 to 5.

10. An ink-jet recording apparatus comprising an ink cartridge equipped with an ink-storing portion storing an ink and a head portion for ejecting the ink, wherein the ink is the ink-jet water-based ink according to any one of claims 1 and 2 to 5.

* * * * *